United States Patent
Goebel et al.

(10) Patent No.: US 7,687,182 B2
(45) Date of Patent: Mar. 30, 2010

(54) PRESSURIZED COOLANT FOR STAMPED PLATE FUEL CELL WITHOUT DIFFUSION MEDIA IN THE INACTIVE FEED REGION

(75) Inventors: Steven G. Goebel, Victor, NY (US);
Jeffrey A. Rock, Fairport, NY (US);
Dirk Rensink, Mainz (DE); Steven J. Spencer, Rochester, NY (US); William H. Pettit, Rochester, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 1136 days.

(21) Appl. No.: 11/245,969

(22) Filed: Oct. 7, 2005

(65) Prior Publication Data
US 2007/0082252 A1    Apr. 12, 2007

(51) Int. Cl.
*H01M 2/00* (2006.01)
*H01M 2/02* (2006.01)
*H01M 2/08* (2006.01)
*H01M 2/14* (2006.01)

(52) U.S. Cl. .............................. 429/38; 429/34; 429/35; 429/36; 429/37; 429/39

(58) Field of Classification Search .............. 429/34–39
See application file for complete search history.

(56) References Cited

U.S. PATENT DOCUMENTS

| 5,763,113 | A | 6/1998 | Meltser et al. |
| 6,974,648 | B2 | 12/2005 | Goebel et al. |
| 7,291,414 | B2 * | 11/2007 | Goebel et al. ................ 429/34 |
| 2005/0058864 | A1 | 3/2005 | Goebel |

OTHER PUBLICATIONS

U.S. Appl. No. 11/009,378, filed Dec. 10, 2004.
U.S. Appl. No. 11/009,378, filed Dec. 10, 2004, Goebel et al.

* cited by examiner

*Primary Examiner*—Dah-Wei D Yuan
*Assistant Examiner*—Steven Scully

(57) ABSTRACT

Clearance gaps in the inactive feed regions of a fuel cell stack are controlled by non-bonded, non-nested bipolar plates to provide reactant flow uniformity and pressure within fuel cells and fuel cell stacks utilizing nested bipolar plates in the active feed regions and non-nested bipolar plates in the inactive feed regions.

4 Claims, 6 Drawing Sheets

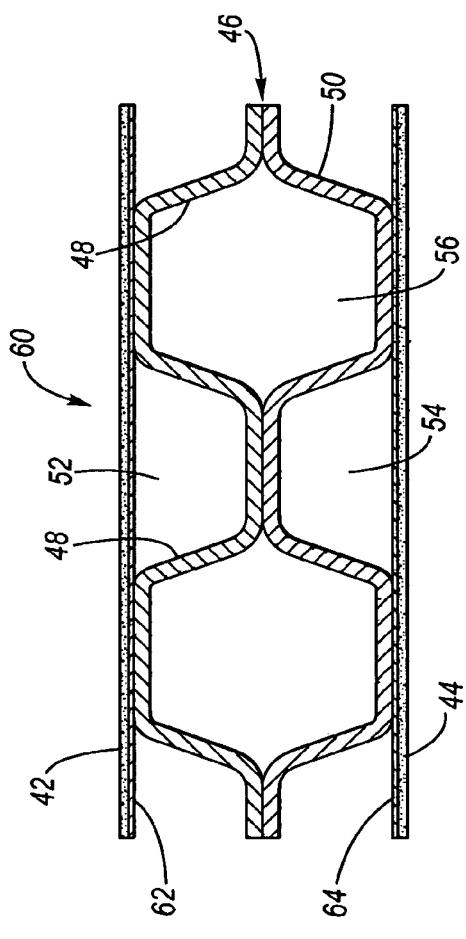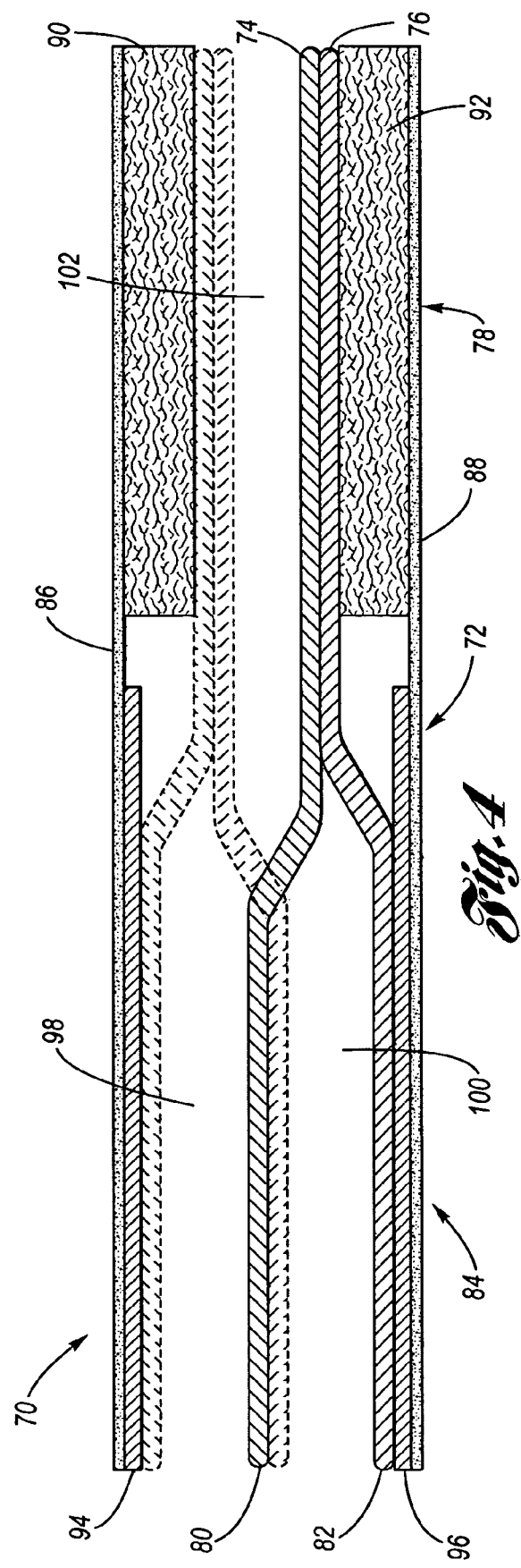

PRESSURIZED COOLANT FOR STAMPED PLATE FUEL CELL WITHOUT DIFFUSION MEDIA IN THE INACTIVE FEED REGION

TECHNICAL FIELD

The present invention relates to proton exchange membrane (PEM) fuel cells and, more particularly, to pressurized coolant in non-bonded bipolar plates separating adjacent fuel cells in a fuel cell stack.

BACKGROUND OF THE INVENTION

Fuel cells have been used as a power source in many applications. For example, fuel cells have been proposed for use in electrical vehicular power plants to replace internal combustion engines. In proton exchange membrane (PEM) type fuel cells, hydrogen (or hydrogen containing gas) is supplied to the anode of the fuel cell and oxygen is supplied as the oxidant to the cathode. The oxygen can be either a pure form ($O_2$) or air (a mixture of $O_2$ and $N_2$). PEM fuel cells include a membrane electrode assembly (MEA) comprising a thin, proton transmissive, non-electrically conductive, solid polymer electrolyte membrane having the anode catalyst on one face and the cathode catalyst on the opposite face.

The term "fuel cell" is typically used to refer to either a single cell or a plurality of cells (stack) depending on the context. A plurality of individual cells are typically bundled together to form a fuel cell stack and are commonly arranged in electrical series. Each cell within the stack includes the membrane electrode assembly (MEA) described earlier, and each such MEA provides its increment of voltage. A group of adjacent cells within the stack is referred to as a cluster. By way of example, some typical arrangements for multiple cells in a stack are shown and described in U.S. Pat. No. 5,763,113.

The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of flow field plates or bipolar plates positioned between the several MEAs in the stack. The bipolar plates include an anode side and a cathode side for adjacent fuel cells in the stack. Anode gas flow channels are provided in the anode side of the bipolar plates that allow the anode gas to flow to the anode side of each MEA. Cathode gas flow channels are provided in the cathode side of the bipolar plates that allow the cathode gas to flow to the cathode side of each MEA. The bipolar plates are made of a conductive material, such as stainless steel, so that they conduct the electricity generated by the fuel cells from one cell to the next cell as well as out of the stack.

It has previously been proposed by the inventors in U.S. Patent Application 2005/0058864 A1, titled "Nested Bipolar Plate for Fuel Cell and Method", published Mar. 17, 2005, the entire disclosure of which is hereby incorporated herein by reference, that the thickness or repeat distance of a fuel cell stack can be reduced by nesting the flow channels in the active feed region of the fuel cells. In this design, the fuel cell stack includes two MEAs for adjacent fuel cells in the stack (there is one MEA per bipolar plate). Each MEA includes a membrane of the type referred to above, an anode side catalyst layer and a cathode side catalyst layer. An anode side gas diffusion media layer is positioned adjacent to the MEA and a cathode side gas diffusion media layer is positioned adjacent to the MEA. A bipolar plate assembly is positioned between the diffusion media layers. The bipolar plate assembly includes two stamped metal bipolar plates that are assembled together in the nested configuration. The nested plates define parallel anode gas flow channels and parallel cathode gas flow channels, where the anode flow channels provide a hydrogen flow to the anode side of the MEA and the cathode flow channels provide airflow to the cathode side of the MEA. Additionally, the plates define coolant flow channels through which a cooling fluid flows to cool the fuel cell stack.

A fuel cell in a fuel cell stack that provides a transition from nested bipolar plates in the active feed region of the stack to non-nested bipolar plates in the inactive feed regions of the stack without giving up the reduced stack thickness provided by the nested plates or changing the size of the flow channels has previously been proposed by the inventors in U.S. patent application Ser. No. 11/009,378, titled "Reactant Feed for Nested Stamped Plates for a Compact Fuel Cell", filed Dec. 10, 2004, the entire disclosure of which is hereby incorporated herein by reference. Particularly, the diffusion media layers in the fuel cells of the stack are removed in the inactive feed regions where the bipolar plates are non-nested so that the volume necessary to maintain the size of the flow channels is provided without the need to increase the distance between adjacent MEAs. Additionally, the membrane of the MEAs would not be catalyzed in the inactive feed regions. A thin shim can be provided between the membrane and the plates in the inactive feed regions to support the membrane where the diffusion media layer has been removed to prevent the membrane from intruding into the flow channels and blocking the reactive flow. However, clearance gaps in the inactive feed regions are required to ensure adequate contact of diffusion media and bipolar plates in the active feed regions to reduce the electrical contact resistance. These clearance gaps result in variations in reactant flow uniformity and pressures within a cell, and from cell to cell within a stack, due to variations in tolerances in part thicknesses.

Accordingly, what is needed in the art is a method to control clearance gaps in the inactive feed regions to provide reactant flow uniformity and pressure within fuel cells and fuel cell stacks utilizing nested bipolar plates in the active feed regions.

SUMMARY OF THE INVENTION

The present invention is a method to control clearance gaps in the inactive feed regions utilizing non-bonded, non-nested bipolar plates to provide reactant flow uniformity and pressure within fuel cells and fuel cell stacks wherein the bipolar plates in the active feed regions are nested.

In fuel cells and fuel cell stacks, it is necessary, upon assembly, for the compression load to be substantially carried over the diffusion media in the active feed regions to reduce the electrical contact resistance between the diffusion media and bipolar plates. To ensure that this is the case, clearance gaps between the bipolar plates and membranes or shims in the inactive feed regions are required. Due to variations in tolerances in part thicknesses, the clearance gaps in the inactive feed regions can vary between fuel cells, thereby producing variations in the heights of the reactant channels whereby reactant flow is affected. The reactant flow is more sensitive to variations in the clearance gaps as a greater portion of the overall reactant pressure drop occurs in the inactive feed regions compared to the active feed regions. For the coolant flow, however, most of the coolant pressure drop occurs in the active feed regions, so variations of coolant pressure in the inactive feed regions are not as critical.

In accordance with the present invention, to control clearance gaps in the inactive feed regions utilizing non-nested bipolar plates to provide reactant flow uniformity and pressure within fuel cells and fuel cell stacks wherein the bipolar plates in the active feed regions are nested, the non-nested bipolar plates in the inactive feed regions are non-bonded, the coolant flow is pressurized above the reactant pressures, and the bipolar plates are stamped such that the bipolar plate heights of the non-bonded bipolar plates in the inactive feed regions ensure clearance gaps in the inactive feed regions of each fuel cell within a fuel cell stack.

Utilizing non-bonded bipolar plates in the inactive feed regions in conjunction with pressurizing the coolant flow above the reactant pressures provides clearance gaps only in the coolant channels in the inactive feed regions, thereby eliminating the variations in heights of the reactant channels. Thus, clearance gaps in the coolant channels in the inactive feed regions of each fuel cell within a fuel cell stack having nested active feed regions provide reactant flow uniformity and pressure within fuel cells and fuel cell stacks since coolant pressure drop is less sensitive to variations of clearance gap heights in the inactive feed regions than the reactant flow pressure drops in the inactive feed regions, as previously mentioned.

BRIEF DESCRIPTION OF THE DRAWING

The description herein makes reference to the accompanying drawings wherein like reference numerals refer to like parts throughout the several views.

FIG. 3 is a partial cross-sectional view of an inactive feed region of a fuel cell stack employing non-nested stamped bipolar plates where the gas diffusion media layers have been removed and shims have been added.

FIG. 4 is a partial cross-sectional view of the transition between an inactive feed region and an active feed region of a fuel cell stack.

DESCRIPTION OF THE PREFERRED EMBODIMENT

Figure 1:
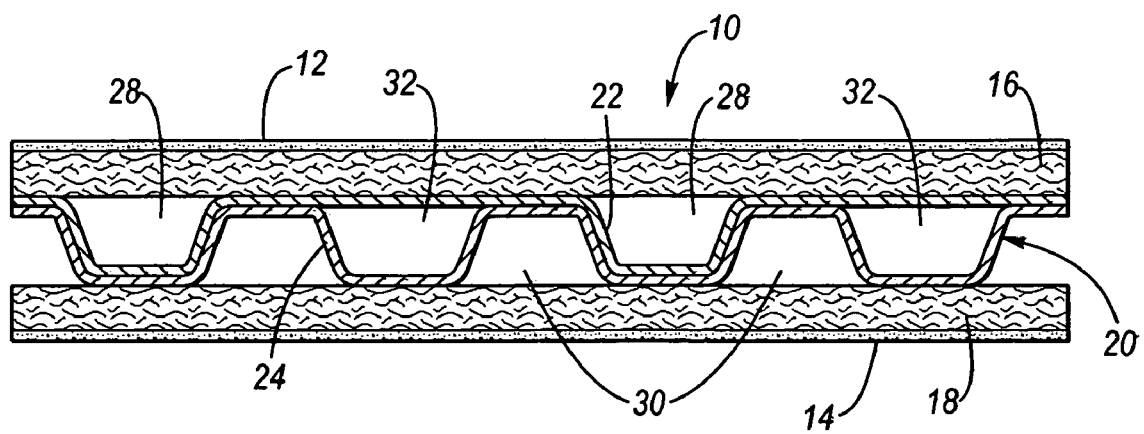
FIG. 1 is a partial cross-sectional view of an active feed region of a fuel cell stack employing nested stamped bipolar plates, wherein a clearance (not shown for simplicity) between the anode reactant channel bottom and the back side of the cathode reactant land, as well as on the sides of these nested channels makes the assembly thickness insensitive to the draw depth variations of the anode.

FIG. 1 is a cross-sectional view of a portion of an inactive region of a fuel cell stack 10 according to the present invention (which is also described in aforementioned U.S. Patent Application 2005/0058864 A1). An anode side gas diffusion media layer 16 is positioned adjacent to the MEA 12 and a cathode side gas diffusion media layer 18 is positioned adjacent to the MEA 14. The diffusion media layers 16 and 18 are porous layers that provide for input gas transport to, and water transport from, the MEAs 12 and 14. Various techniques are known in the relevant art for depositing the catalyst layers on the membranes in the MEAs 12 and 14 or on the diffusion media layers 16 and 18.

A bipolar plate assembly 20 is positioned between the diffusion media layers 16 and 18. The bipolar plate assembly 20 includes two stamped metal bipolar plates 22 and 24 that are assembled together in the nested configuration as shown. The nested plates 22 and 24 define parallel anode gas flow channels 28 and parallel cathode gas flow channels 30, where the anode flow channels 28 provide a hydrogen flow to the anode side of the MEA 12 and the cathode flow channels 30 provide airflow to the cathode side of the MEA 14. Additionally, the plates 22 and 24 define coolant flow channels 32 through which a cooling fluid flows to cool the fuel cell stack 10, as is well understood in the relevant art. In this design, the size of the coolant flow channels 32 is reduced from the size of the cooling channels provided in the non-nested stamped plates of the prior art, which provides reduction in the repeat distance of the fuel cell stack 10. Reducing the size of the coolant flow channels 32 over the known cooling channels does not significantly affect the cooling capability of the cooling channels because the larger channels were more than adequate to provide the necessary cooling. The reduction in coolant volume also reduces the thermal mass that must be heated during system start-up.

The anode flow channels 28 are in fluid communication with an anode flow channel header at each end of the fuel cell stack 10, where one header receives the anode gas flow to distribute it to the anode flow channels 28 and the other anode header receives the anode exhaust gas from the anode flow channels. Likewise, the cathode flow channels 30 are in fluid communication with a cathode flow channel header at each end of the stack 10. The coolant flow channels 32 are in fluid communication with a coolant flow channel header at each end of the stack 10. However, in order to couple the anode flow channels 28 to the anode channel headers, the cathode flow channels 30 to the cathode channel headers and the coolant flow channels 32 to the coolant channel headers, it is necessary to separate and non-nest the plates 22 and 24 in the inactive feed regions of the stack.

Because a non-nested configuration of the flow channels 28, 30 and 32 requires more space than the nested configuration of the channels 28, 30 and 32, the reduction in thickness of the stack 10 provided by the nested configuration would be eliminated by using the known non-nested configuration in the inactive feed regions. It is possible to reduce the size of the flow channels 28, 30 and 32 in the non-nested inactive feed regions so that the flow channels 28, 30 and 32 do not use more space than they use in the nested configuration. However, such a reduction in the size of the flow channels 28, 30 and 32 would cause a pressure drop across the channels that would adversely affect the flow rate and performance of the stack 10.

Figure 2:
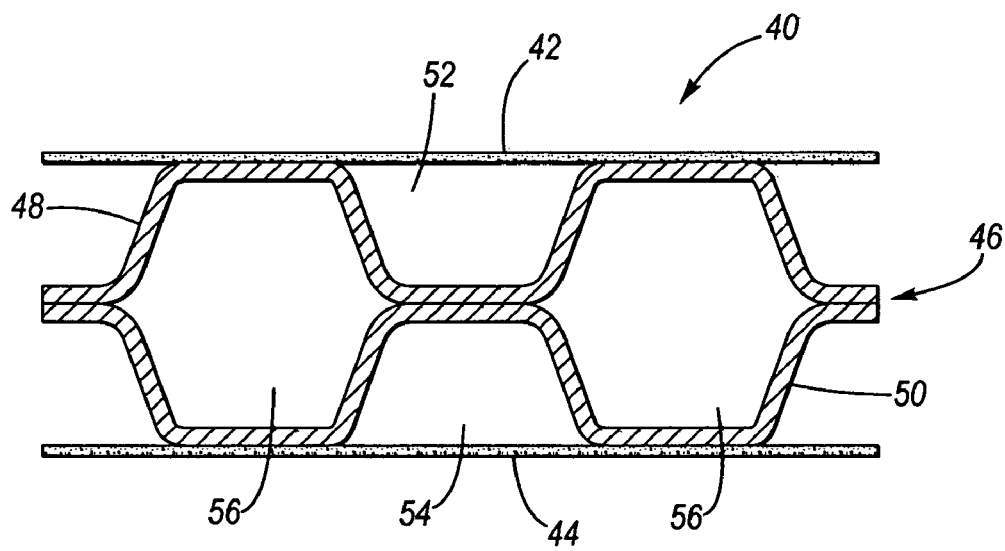
FIG. 2 is a partial cross-sectional view of an inactive feed region of a fuel cell stack employing non-nested stamped bipolar plates where the gas diffusion media layers have been removed.

FIG. 2 is a partial cross-sectional view through an inactive feed region of a fuel cell stack 40. The stack 40 includes adjacent membranes 42 and 44 that are part of two adjacent MEAs in the stack 40. The fuel cell stack 40 also includes a bipolar plate assembly 46 having two stamped non-nested bipolar plates 48 and 50. The plates 48 and 50 are stamped so that they define anode flow channels 52, cathode flow channels 54 and coolant flow channels 56.

It is necessary that the plates 48 and 50 be non-nested in the inactive feed regions of the stack 40 so that the input gases and the cooling fluid can be separated and coupled to appropriate manifold headers. The fuel cell stack 40 would include a transition region, discussed below, between the active feed region and the inactive feed regions of the fuel cell stack 40 where the anode flow channels 52 are in fluid communication with the anode flow channels 28, the cathode flow channels 54 are in fluid communication with the cathode channels 30 and the coolant flow channels 56 are in fluid communication with the coolant flow channels 32.

According to the present invention, the size of the non-nested channels 52 and 54 are the same, or nearly the same, as the size of the nested channels 28 and 30, respectively, by eliminating the diffusion media layers 16 and 18 in the inactive feed regions of the fuel cell stack 40. In the inactive feed regions, the catalyst layers of the MEAs 12 and 14 (FIG. 1) would also be eliminated leaving sub-gaskets or sub-gasketed membranes 42 and 44. Note that the MEAs 12 and 14 would typically include a sub-gasket (not shown) outside of the active feed region. The sub-gasket prevents direct contact of the ionomer membrane to the plates 48 and 50 or the seals. The sub-gasket would typically be a 25 micrometers thickness film of Kapton or other suitable plastic. Therefore, the volume that was used by the diffusion media layers 16 and 18 (FIG. 1) in the active feed region of the fuel cell stack 40 can be used to accommodate the non-nested bipolar plates 48 and 50 in the inactive feed regions so that the size of the flow channels can be maintained without increasing the repeat distance of the stack 40. The diffusion media layers 16 and 18 are generally about 0.2 mm thick, which is enough to provide the necessary space.

The size of the coolant flow channels 56 does increase to about twice the size from the nested configuration to the non-nested configuration, but the pressure drop provided by the coolant channel transition does not adversely affect the performance of the stack 40. Further, the inactive feed regions with non-nested plates may increase the plate footprint for the active feed region, but the overall volume of the stack is reduced because of the decrease in stack height provided by the nested plates.

Because the membranes 42 and 44 are not supported by the diffusion media layers 16 and 18 in the inactive feed regions of the stack 40, they may have a tendency to intrude into the flow channels 52 and 54. As the MEA typically includes sub-gaskets beyond the active feed region, with sufficient thickness, the sub-gaskets could provide adequate membrane support in the inactive feed regions. FIG. 3 is a cross-sectional view of a fuel cell stack 60 that is similar to the fuel cell stack 40, where like elements are identified by the same reference numeral. The fuel cell stack 60 includes a thin shim 62 positioned between the membrane 42 and the plate 48 and a thin shim 64 positioned between the membrane 44 and the plate 50. The shims 62 and 64 prevent the membranes 42 and 44, respectively, from intruding into the flow channels 52 and 54, respectively. The shims 62 and 64 can be located in place or can be either bonded to the membranes 42 and 44, respectively, or to the plates 48 and 50, respectively. The shims 62 and 64 may also function as a gasket carrier. The shims 62 and 64 can be made of any suitable material, such as metal or plastic, and can have a suitable thickness, such as 100 micrometers, to provide the desired support. Adequate support can also be achieved by using a single shim 62 or 64 that would be bonded to the adjacent membrane 42 or 44.

FIG. 4 is a cross-sectional view of a portion of a fuel cell stack 70 showing an example of a transition region 72 between nested bipolar plates 74 and 76 in an active feed region 78 of the fuel cell stack 70 and non-nested bipolar plates 80 and 82 in an inactive feed region 84 of the fuel cell stack 70. The fuel cell stack 70 includes membranes 86 and 88 extending across the active feed region 78 and the inactive feed region 84. Gas diffusion media layers 90 and 92 are provided adjacent to the membranes 86 and 88, respectively, in the active feed region 78. Shims 94 and 96 are positioned between the non-nested plates 80 and 82 and the membranes 86 and 88, respectively, in the inactive feed region 84. The relative size of anode and cathode flow channels 98 and 100 in the inactive feed region 84 and the active feed region 78 are substantially the same. Flow channel 102 in the active feed region 78 can represent any of the anode flow channel, the cathode flow channel or the coolant flow channel.

Figure 5:
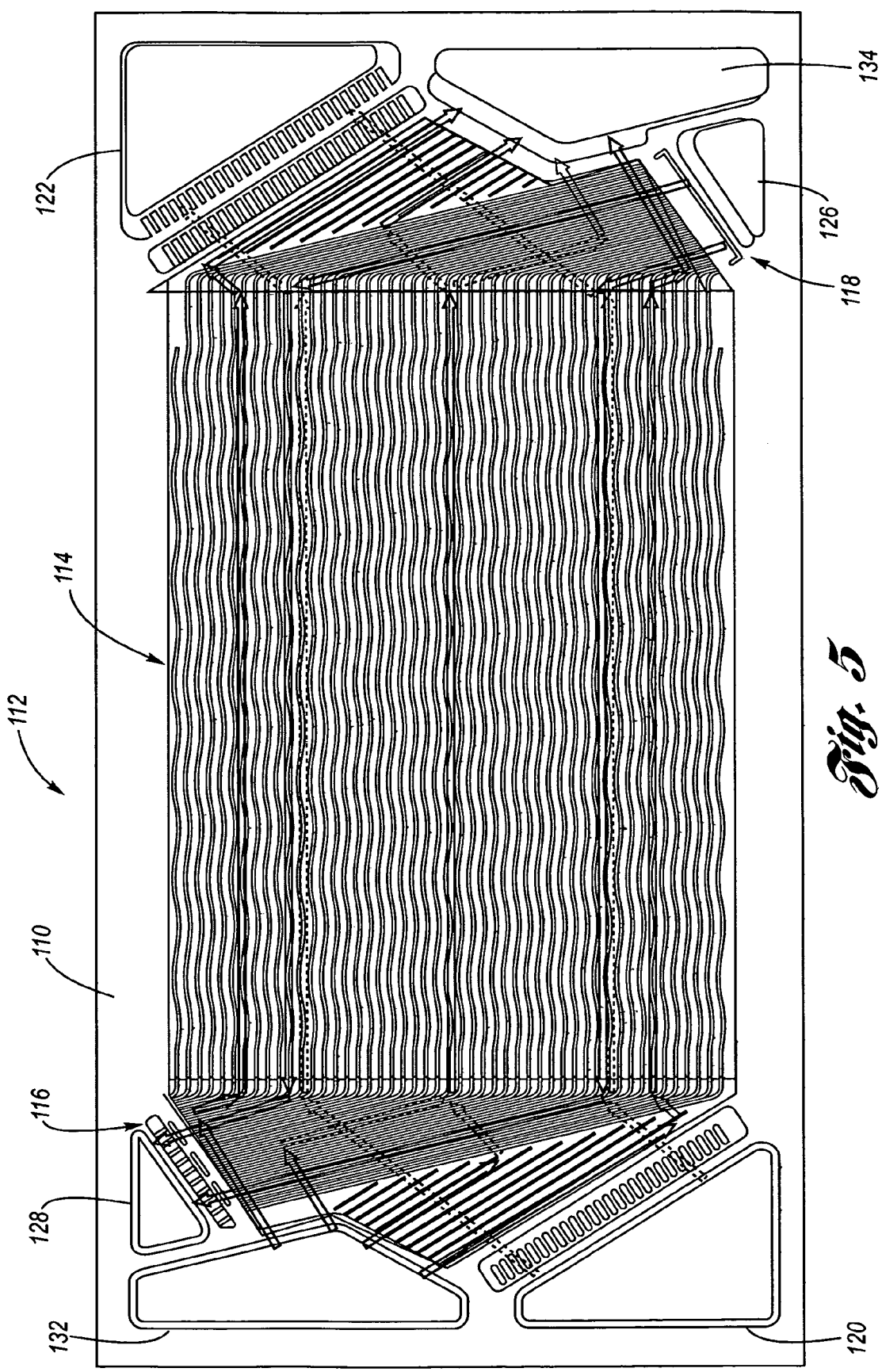
FIG. 5 is a top view of a plate in a fuel cell stack.

FIG. 5 is top view of a bipolar plate assembly 110 in a fuel cell stack 112. The fuel cell stack 112 includes an active feed region 114 having stamped bipolar plates that are nested, and inactive feed regions 116 and 118, at opposite ends of the active feed region 114, wherein the stamped bipolar plates are non-nested, consistent with the discussion above. The stamped bipolar plates include the various flow channels discussed above. A cathode inlet header 120 at one end of the fuel cell stack 112 directs the cathode air into the cathode flow channels in the inactive feed region 116. The cathode air flows through the cathode flow channels in the inactive feed region 116, through the cathode flow channels in the active feed region 114 and through the cathode flow channels in the inactive feed region 118. The cathode exhaust gas is collected by a cathode outlet header 122.

An anode inlet header 126 at one end of the fuel cell stack 112 directs the hydrogen gas into the anode flow channels in the inactive feed region 118. The hydrogen gas flows through the anode flow channels in the inactive feed region 118, through the anode flow channels in the active feed region 114 and through the anode flow channels in the inactive feed region 116. The anode exhaust gas is collected by an anode outlet header 128. In this non-limiting embodiment, the anode gas and the cathode gas are counter-flow.

A coolant inlet header 132 at one end of the fuel cell stack 112 directs the cooling fluid into the coolant flow channels in the inactive feed region 116. The cooling fluid flows through the coolant flow channels in the inactive feed region 116, through the coolant flow channels in the active feed region 114 and through the coolant flow channels in the inactive feed region 118. The cooling fluid is collected by a coolant outlet header 134.

Figure 6:
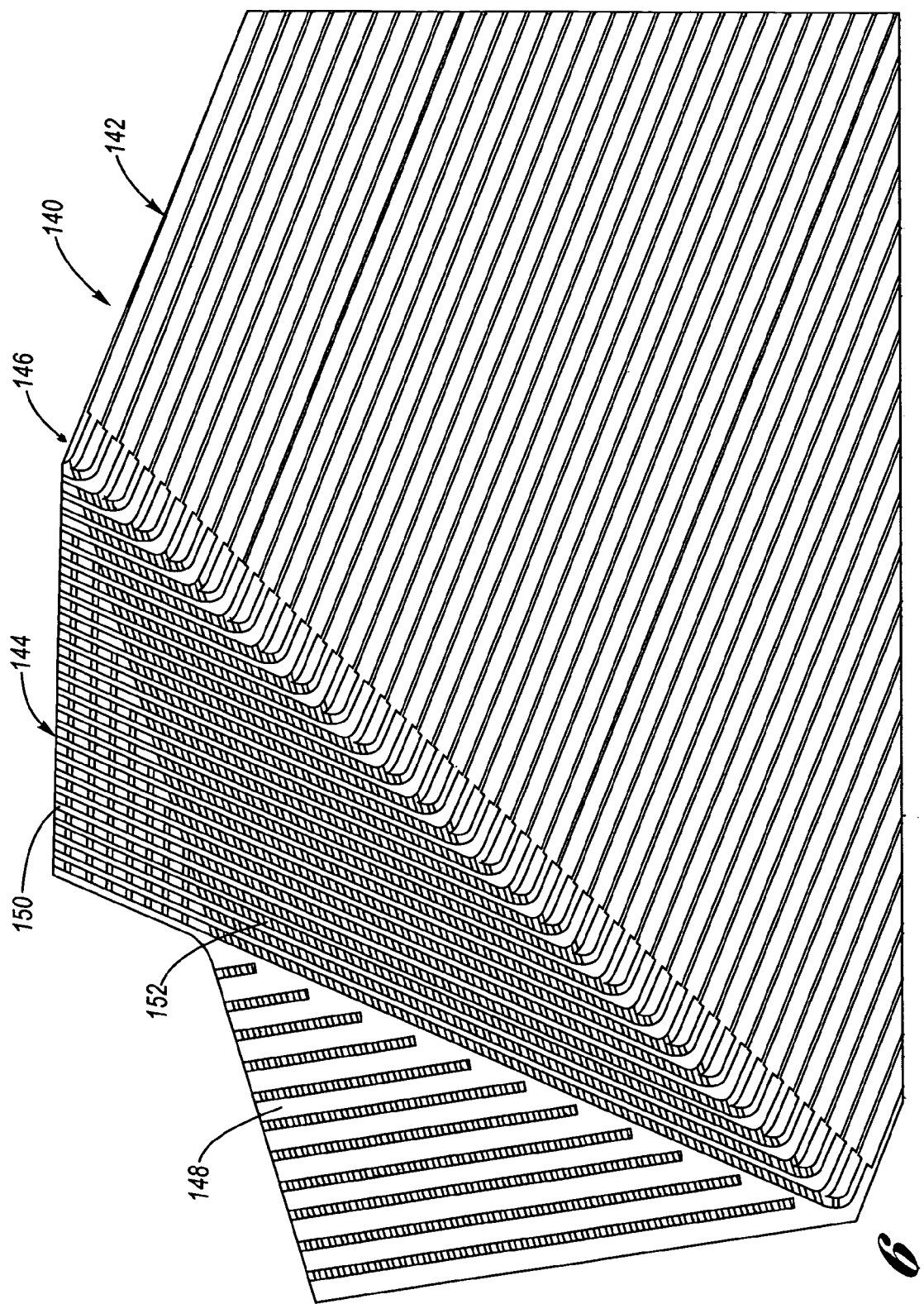
FIG. 6 is a solid model of the coolant volume of a fuel cell including an active feed region having nested stamped bipolar plates and an inactive feed region wherein the stamped bipolar plates are non-nested.

FIG. 6 is a solid model perspective view of the coolant volume of a fuel cell 140 including an active feed region 142 having the nested bipolar plates and an inactive feed region 144 wherein the bipolar plates are non-nested. A transition region 146 between the active feed region 142 and the inactive feed region 144 provides the transition of the channels from the nested configuration to the non-nested configuration. The cooling fluid from the coolant header (not shown in FIG. 6) is directed into flow channels 148 in the inactive feed region 144, the hydrogen gas flow from the anode header (not shown in FIG. 6) is directed into flow channels 150 in the inactive feed region 144 and the cathode gas from the cathode header (not shown in FIG. 6) is directed into flow channels 152 in the inactive feed region 144. In this embodiment, the anode gas and the cathode gas are co-flow.

Table I below provides a comparison of various parameters discussed above for a nested plate design according to the present invention having no diffusion media in the inactive feed regions, a non-nested plate design, and a nested plate design having diffusion media in the inactive feed regions. This data is from a fuel cell stack including a 360 cm² active area, 200 cells, 66 kW output power, 1.5 A/cm² current density and a low pressure. The nested designs are smaller than the non-nested designs, have a higher power density (higher kW/liter), and have an even greater reduction in thermal mass from 27 to 19-20 kJ/kilogram due to the reduced coolant volume. The nested plate design having diffusion media in the inactive feed regions produces very shallow feed channels in the inactive feed regions and leads to an unacceptably high pressure drop (85 kPa vs. 30 kPa on the cathode side).

TABLE I

| Parameter | Nested[1] | Non-Nested[2] | Nested[3] |
|---|---|---|---|
| Cathode channel depth (mm) | 0.34 | 0.35 | 0.34 |
| Anode channel depth (mm) | — | 0.31 | — |
| Feed channel depth (mm) | 0.17 | — | 0.17 |
| Repeat distance (mm) | 0.97 | 1.29 | 0.97 |
| Anode ΔP (kPa) | 13 | 13 | 30 |
| Cathode ΔP (kPa) | 30 | 30 | 85 |
| Coolant ΔP (kPa) | 57 | 22 | 106 |
| Power density (kW/l) | 6.0 | 4.8 | 6.3 |
| Thermal mass (kJ/K) | 20 | 27 | 19 |

[1]Nested in active feed region, non-nested in inactive feed regions, and with no diffusion media in the inactive feed regions.
[2]Non-nested, and no inactive feed regions.
[3]Nested in active feed region, and non-nested in inactive feed regions, with diffusion media in the inactive feed regions.

Figure 7:
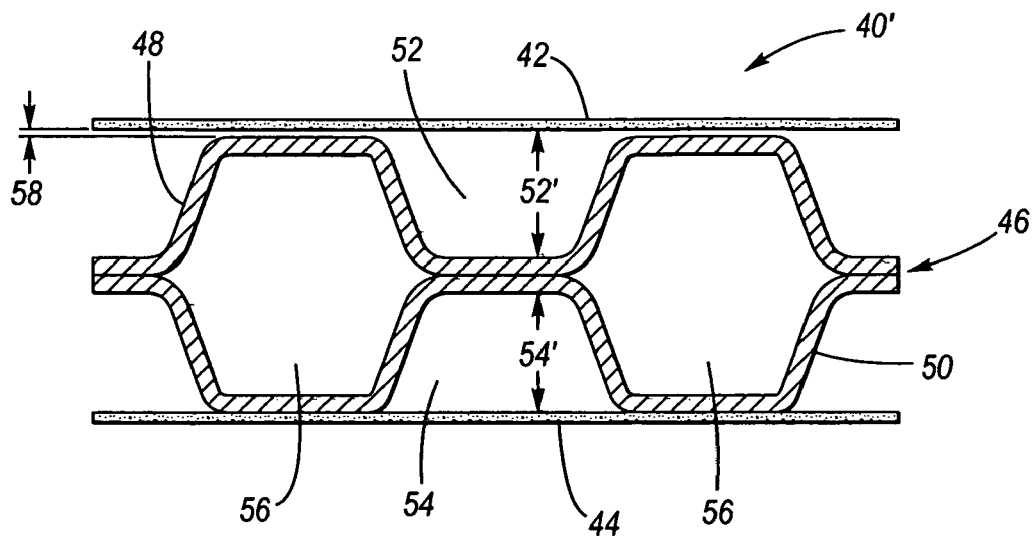
FIG. 7 is a partial cross-sectional view of an inactive feed region of a fuel cell stack employing non-nested stamped bipolar plates where the gas diffusion media layers have been removed and clearance gaps have been introduced.

As previously mentioned, in fuel cells and fuel cell stacks, it is necessary, upon assembly, for the compression load to be substantially carried over the diffusion media in the active feed regions to reduce the electrical contact resistance between the diffusion media and bipolar plates. To ensure that this is the case, clearance gaps between the bipolar plates and membranes or shims in the inactive feed regions are required. This is exemplified by FIG. 7. FIG. 7 is an example of a cross-sectional view of a fuel cell stack 40' that is similar to the fuel cell stack 40, where like elements are identified by the same reference numeral. Fuel cell stack 40' includes clearance gap 58 introduced into fuel cell stack 40 of FIG. 2 to ensure for the compression load to be substantially carried over the diffusion media in the active feed regions to reduce the electrical contact resistance between the diffusion media and bipolar plates whereby a variation between the height 52' of anode flow channel 52 and the height 54' of cathode flow channel 54 is produced. Similar clearance gaps are introduced into fuel cell stacks 60 of FIG. 3 and 70 of FIG. 4. It is also noted that due to variations in tolerances in part thicknesses, the clearance gaps, for example 58, in the inactive feed regions can vary between fuel cells within a fuel cell stack, thereby also producing variations in the heights of the reactant channels whereby reactant flow is affected.

The reactant flow is more sensitive to variations in the clearance gaps, for example 58, as a greater portion of the overall reactant pressure drop occurs in the inactive feed regions compared to the active feed regions. For the coolant flow, however, most of the coolant pressure drop occurs in the active feed regions, so variations of coolant pressure in the inactive feed regions are not as critical to the overall flow per plate.

Figure 8:
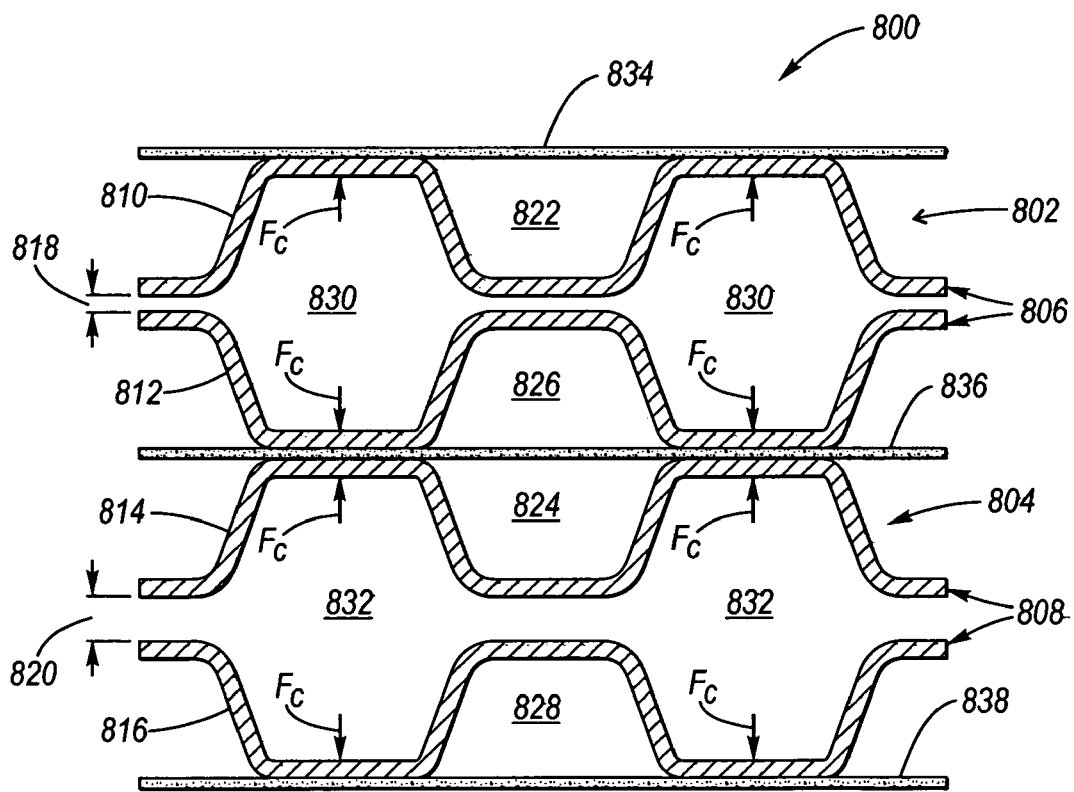
FIG. 8 is a partial cross-sectional view of an inactive feed region of a fuel cell stack employing non-nested, non-bonded stamped bipolar plates where the gas diffusion media layers have been removed and clearance gaps have been introduced according to the present invention.

FIG. 8 is a partial cross-sectional view of an inactive feed region of a fuel cell stack 800 according to the present invention. The stack 800 includes adjacent cells 802, 804 employing non-nested bipolar plate assemblies 806, 808 consisting of non-bonded bipolar plates 810-816 having clearance gaps 818, 820 according to the present invention. Clearance gaps 818, 820 may have different heights due to variations in part thicknesses. The cells 802, 804 define anode flow channels 822, 824, cathode flow channels 826, 828, and coolant flow channels 830, 832. The cells 802, 804 include membranes 834-838. Although membranes 834-838 are depicted without shims, it is preferable to include shims in stack 800 as exemplified at FIG. 9.

Pressurizing the coolant in coolant channels 830, 832 above the pressures of anode flow channels 822, 824 and cathode flow channels 826, 828 forces the non-bonded bipolar plates 810-816 against membranes 834-838 thereby controlling the clearance gaps 818, 820 and ensuring the clearance gaps to be only in the coolant channels. Because the membranes 834-838 are not supported by the diffusion media layers (see by way of example 16 and 18 of FIG. 1), they may have a tendency to intrude into the flow channels 822-828. As the MEA typically includes sub-gaskets beyond the active feed region, with sufficient thickness, the sub-gaskets could provide adequate membrane support in the inactive feed regions.

Figure 9:
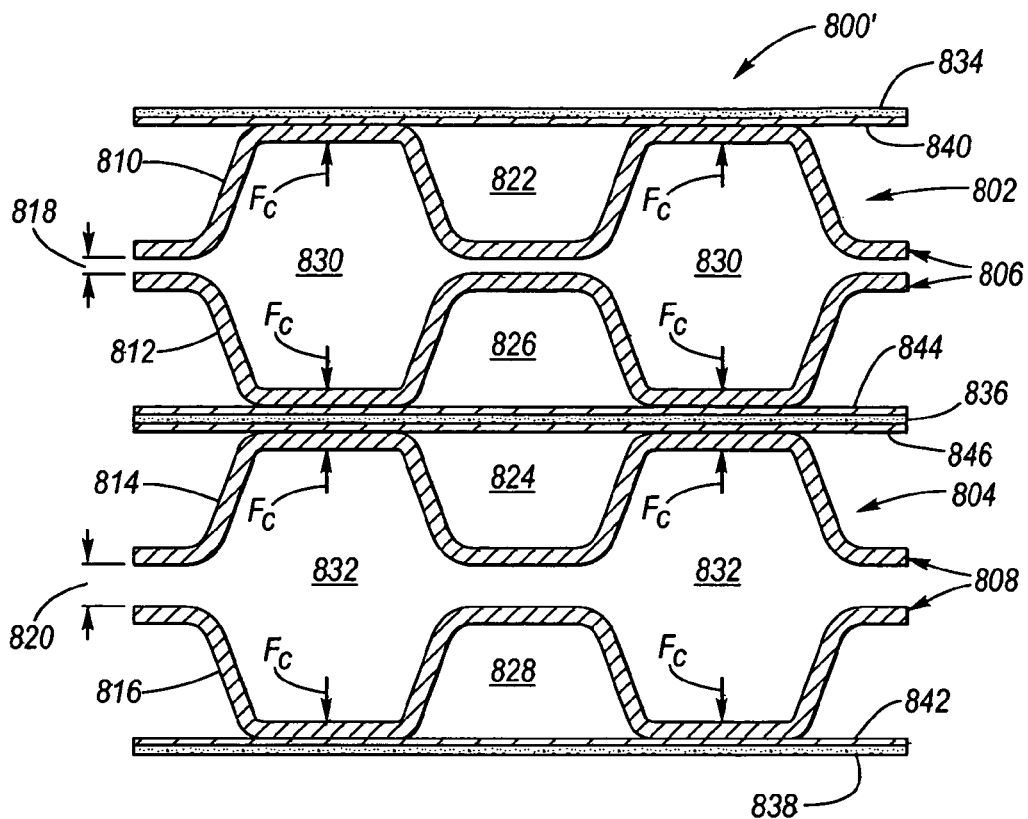
FIG. 9 is a partial cross-sectional view of an inactive feed region of a fuel cell stack employing the non-nested, non-bonded stamped bipolar plates as in FIG. 8, now including shims.

FIG. 9 (most preferred) is a partial cross-sectional view of an inactive feed region of a fuel cell stack 800' that is similar to the fuel cell stack 800 of FIG. 8, where like elements are identified by the same reference numeral. The fuel cell stack 800' now includes a thin shim 840 positioned between the membrane 834 and the plate 810, a thin shim 842 positioned between the membrane 838 and the plate 816, a thin shim 844 positioned between the membrane 836 and the plate 812, and a thin shim 846 positioned between the membrane 836 and the plate 814. The shims 840-846 prevent the membranes 834-838, respectively, from intruding into the flow channels 822-828, respectively. The shims can be located in place or can be either bonded to the membranes, respectively, or to the plates, respectively. The shims may also function as a gasket carrier. The shims can be made of any suitable material, such as metal or plastic, and can have a suitable thickness, such as 100 micrometers, to provide the desired support. Adequate support can also be achieved by using a single shim (844 or 846) at membrane 836, which may be bonded to the membrane.

Cell 802 may, for example, exemplify cell 40' of FIG. 7, wherein the bipolar plate assembly 46 is non-bonded and the coolant pressure in coolant channels 56 is above the pressures of anode flow channels 52 and cathode flow channels 54 thereby transferring clearance gap 58 from the anode flow channels to the coolant flow channels. Since the coolant flow in coolant channels 830, 832 is less sensitive to pressure drops in the inactive feed region than the reactant flow in the anode flow channels 822, 824 and cathode flow channels 826, 828 in the inactive feed regions, clearance gaps 818, 820 in the coolant channels in the inactive feed regions ensure cell to cell flow and pressure uniformity in the active feed regions.

Table II below provides a comparison of various calculated coolant pressure drops in coolant flow channels, for example

830, 832, to clearance gap heights, for example 818, 820 in the inactive feed regions according to the present invention.

TABLE II

|  | Gap (mm) | | |
| --- | --- | --- | --- |
|  | 0 | 0.1 | 0.2 |
| Coolant pressure drop (kPa) | 60 | 44 | 38 |

In Table II, a clearance gap range of 0.1 mm from no gap to 0.1 mm gap has a coolant pressure drop range of, approximately, +/−15%, while a clearance gap range of 0.1 mm from 0.1 mm gap to 0.2 mm gap has a coolant pressure drop range of, approximately, +/−7%. In accordance with the present invention, bipolar plates are stamped such that the bipolar plate heights of the non-bonded bipolar plates in the inactive feed regions ensure clearance gaps in the inactive feed regions of each fuel cell within a fuel cell stack. Doing so ensures that the coolant pressure drop is less sensitive to the variations in the heights of the clearance gaps as presented in Table II. From computational fluid dynamics calculations, it was found that that the clearance gaps in the coolant flow channels in the inactive feed regions according to the present invention did not adversely affect coolant flow distribution within a fuel cell, but rather improved it.

There will be some minor plate to plate dimensional differences along the length of the parts. Even though all the plate inlets and outlets are connected to the same inlet and outlet headers, dimensional variations will cause differences in the pressure distribution along the length of the plates. In FIG. 8, consider the case where the flow through the central region of the upper plate is less than the mean value due to more restrictive dimensions inside the plate. This restriction will make the overall flow less than mean values and cause a lesser portion of the common total pressure drop to then appear in both inlet and outlet feed regions of that plate (that is, the anode and cathode feed channels). This causes the average pressure inside the coolant flow channels 830 of the upper plate to be closer to the same pressure as the inlet pressure and consequently higher than the internal pressure of the coolant flow channels 832 of the neighboring lower plates. This provides a tendency of the gap 818 to expand while the gap 820 tends to collapse. Testing has shown that very small pressure differences will quickly deflect a full scale plate a distance many times the average gap between plates. The expansion of the gap 818 further reduces the pressure drop inside the coolant flow channels 830, increasing the internal pressure even more, producing a condition that could collapse the gap from not only the first neighboring plate, but also several more neighbors in both upward and downward directions.

Figure 10:
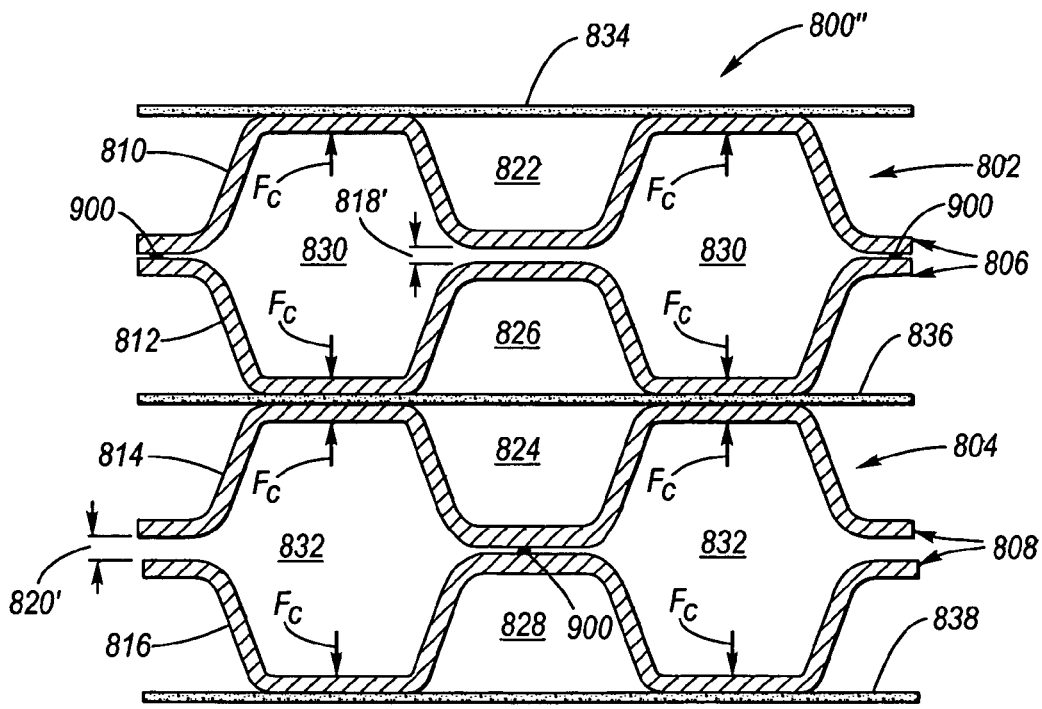
FIG. 10 is a partial cross-sectional view of an inactive feed region of a fuel cell stack, as in FIG. 8, now showing an alternative embodiment featuring periodic, spaced spot welds of the bipolar plates.

To mitigate this response, as shown at FIG. 10, which is similar to FIG. 8 and has like numbers indicating like parts, a pattern of occasional spot welds 900 can be included in the feed area. This pattern should be offset such that the welds of neighboring plates do not align. The spacing on the pattern can be adjusted to create sufficient stiffness to avoid gross distortion of the plates, yet keep the plates, relatively speaking, "non-bonded" in that they are able to float, albeit with periodic weld limitations.

It should be noted that the plates only have to be non-bonded in the inactive feed region. The active feed region may be bonded to ensure low plate-to-plate electrical contact or may not be bonded and rely on compression pressure between plate halves.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A fuel cell stack, comprising:
a bi-polar plate assembly;
an active feed region including a stack of fuel cells, each fuel cell including a membrane electrode assembly having a cathode side and an anode side, a cathode side diffusion media layer on the cathode side of the membrane electrode assembly, an anode side diffusion media layer on the anode side of the membrane electrode assembly, and an active feed region of the bipolar plate assembly positioned between opposing diffusion media layers in adjacent fuel cells, wherein the active feed region of the bipolar plate assembly includes nested bipolar plates defining cathode side flow reactant channels and anode side flow reactant channels; and
an inactive feed region including a stack of membranes that form part of each membrane electrode assembly in the stack of fuel cells and an inactive feed region of the bipolar plate assembly, wherein the inactive feed region of the bipolar plate assembly includes non-nested bipolar plates defining cathode side flow reactant channels and anode side flow reactant channels;
wherein the cathode side flow reactant channels in the inactive feed region are in fluid communication with, and are substantially the same size as, the cathode side flow reactant channels in the active feed region;
wherein the anode side flow reactant channels in the inactive feed region are in fluid communication with, and are substantially the same size as, the anode side flow reactant channels in the active feed region;
wherein the fuel cells are free of diffusion media layers in the inactive feed region;
wherein the non-nested bipolar plates of the inactive feed region of the bipolar plate assembly are mutually non-bonded with respect to each other;
wherein clearance gaps are selectively present between the non-nested bipolar plates of the inactive feed region of the bipolar plate assembly;
wherein the non-nested bi-polar plates of the inactive feed region of the bipolar plate assembly of the inactive feed region also define coolant flow channels, wherein the nested bipolar plates of the active feed region of the bi-polar plate assembly of the active feed region also define coolant flow channels, and wherein the coolant flow channels in the inactive feed region are in fluid communication with the coolant flow channels in the active feed region; and
wherein coolant flow pressure provides, in combination with said non-bonding and clearance gaps of said non-nested bipolar plates of the inactive feed region, a general uniformity of height of the reactant channels in said inactive feed region.

2. The fuel cell stack of claim 1, further comprising shims respectively positioned adjacent to the membranes in the inactive feed region for supporting the membranes.

3. The fuel cell stack of claim 1, wherein the coolant flow channels in the inactive feed region are substantially twice the size as the coolant flow channels in the active feed region.

4. The fuel cell stack of claim 3, further comprising shims positioned adjacent to the membranes in the inactive feed region for supporting the membranes.

* * * * *